United States Patent
Gheorghiu et al.

(10) Patent No.: US 7,248,880 B2
(45) Date of Patent: Jul. 24, 2007

(54) METHODS AND APPARATUS FOR DETERMINING A LOCATION OF A DEVICE

(75) Inventors: Florin Gheorghiu, San Jose, CA (US); William Joseph Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 144 days.

(21) Appl. No.: 10/360,336

(22) Filed: Feb. 7, 2003

(65) Prior Publication Data

US 2004/0157625 A1    Aug. 12, 2004

(51) Int. Cl.
*H04Q 7/20* (2006.01)
(52) U.S. Cl. .................................. 455/456.1
(58) Field of Classification Search ... 455/456.1–456.6
See application file for complete search history.

(56) References Cited

U.S. PATENT DOCUMENTS

| | | | |
|---|---|---|---|
| 4,275,385 A | 6/1981 | White | |
| 5,222,123 A | 6/1993 | Brown et al. | |
| 5,363,425 A | 11/1994 | Mufti et al. | |
| 5,402,469 A | 3/1995 | Hopper et al. | |
| 5,515,426 A | 5/1996 | Yacenda et al. | |
| 5,926,133 A | 7/1999 | Green, Jr. | |
| 6,049,718 A | 4/2000 | Stewart | |
| 6,055,434 A | 4/2000 | Seraj | |
| 6,236,319 B1 | 5/2001 | Pitzer et al. | |
| 6,438,381 B1 | 8/2002 | Alberth, Jr. et al. | |
| 2002/0034953 A1 | 3/2002 | Tricarico | |
| 2003/0021404 A1* | 1/2003 | Wengrovitz | 379/219 |
| 2003/0225893 A1* | 12/2003 | Roese et al. | 709/227 |
| 2004/0203824 A1* | 10/2004 | Mock et al. | 455/456.1 |
| 2005/0020276 A1* | 1/2005 | Maanoja et al. | 455/456.1 |

FOREIGN PATENT DOCUMENTS

| | | |
|---|---|---|
| EP | 1 056 306 A1 | 11/2000 |
| EP | 1 158 826 A2 | 11/2001 |
| EP | 1 280 369 A1 | 1/2003 |
| WO | WO 02/069662 A1 | 9/2002 |

OTHER PUBLICATIONS

"Explanation Note The QuikTrak Technology", QuikTrak Advanced Communication Networks. 6pgs, no date available.

* cited by examiner

*Primary Examiner*—William Trost
*Assistant Examiner*—Marivelisse Santiago-Cordero

(57) ABSTRACT

A system, method, apparatus, means, and computer program code for determining a location of a device connected to a network. According to some embodiments of the present invention, a device, such as an IP enabled or compliant telephone, may receive, detect, or otherwise actively or passively determine a location identifier. The location identifier may be associated with a geographic location of the device. The device may then provide data indicative of the location identifier to another device, such as a network manager device, server, computer, etc. In some embodiments, the device may determine its geographic location after receiving a request for data indicative of its geographic location. In other embodiments, the device may provide data indicative of its geographic location each time it receives, detects or otherwise determines its geographic location. Alternatively, the device may provide data indicative of its geographic location only upon request or when it detects, receives or otherwise determines a new location identifier.

4 Claims, 12 Drawing Sheets

| DEVICE INFORMATION | | | | |
| --- | --- | --- | --- | --- |
| | | | | 700 |
| DEVICE IDENTIFIER 702 | DEVICE TYPE 704 | LOCATION IDENTIFIER 706 | DEVICE IP ADDRESS 708 | DEVICE EXTENSION 710 |
| D-19837 | IP PHONE | L-2314 | 12.34.98.210 | 25671 |
| D-23815 | IP PHONE | L-1218 | 12.34.98.114 | 23402 |
| D-58294 | IP PHONE | L-3357 | 12.34.98.4 | 26947 |
| D-68077 | IP PHONE | UNKNOWN | 12.34.98.168 | 20658 |
| D-84283 | IP PHONE | L-4106 | 12.34.98.73 | 24716 |

FIG. 11

| LOCATION INFORMATION | | | |
|---|---|---|---|
| | | | 750 |
| LOCATION IDENTIFIER 752 | LOCATION DESCRIPTION 754 | TRANSPONDER IDENTIFIER 756 | |
| L-1218 | FIRST FLOOR, AISLE B, CONFERENCE ROOM B | T-630 | |
| L-2314 | SECOND FLOOR, AISLE C, CUBICLE 14 | T-175 | |
| L-3357 | THIRD FLOOR, AISLE C, CUBICLE 57 | T-459 | |
| L-4106 | FOURTH FLOOR, AISLE A, CUBICLE 6 | T-858 | |
| L-5268 | FIFTH FLOOR, AISLE B, COPY ROOM | T-341 | |

FIG. 12

METHODS AND APPARATUS FOR DETERMINING A LOCATION OF A DEVICE

BACKGROUND OF THE INVENTION

The present invention relates to a method and apparatus for determining the location of a device and, more particularly, embodiments of the present invention relate to methods, means, apparatus, and computer program code for determining the location of a device connected to a network.

Knowledge of the physical or geographic location of a telephone or other device can be important for network management, E911 services, and other activities. For example, a network manager may want to know where a device is located so he or she can send someone to repair, reprogram, inventory, etc. the device. Since some devices, especially IP enabled or compliant devices, can be disconnected and reconnected to a communication network, such devices are moved easily, thereby making it difficult to determine or monitor the location of the devices.

It would be advantageous to provide a method and apparatus that enabled the location of a device to be determined, particularly an IP enabled or compliant device.

SUMMARY OF THE INVENTION

According to a specific embodiment, the invention provides a method for determining a location of a device that is part of a communication network. The method includes step of wirelessly receiving at the device data indicative of a location identifier. The data is indicative of the location identifier transmitted by a transponder device. The method also includes the step of providing the data indicative of the location identifier via the communication network to a server of the communication network to associate the location identifier with the device.

According to another specific embodiment, the invention provides a method for determining a location of a device that is part of a communication network. The method includes the steps of sending a first request to a transponder device to broadcast a location identifier associated with the transponder device, receiving data from the device indicative of a detection by the device of the location identifier associated with the transponder device; and associating the location identifier with the device.

These and other specific embodiments are described further in the following detailed description of the invention, the appended claims and the following drawings.

BRIEF DESCRIPTION OF THE DRAWINGS

FIG. 11 is an illustration of a representative device information database of FIG. 10; and FIG. 12 is an illustration of a representative location information database of FIG. 10.

DETAILED DESCRIPTION OF SPECIFIC EMBODIMENTS

There is a market opportunity for systems, means, computer code, and methods that allow the location of telephones and/or other devices in a network to be determined. According to some embodiments of the present invention, a device connected to a network, such as an IP enabled or compliant device (e.g., an IP enabled telephone), may receive, detect, or otherwise actively or passively determine a location identifier. The location identifier may be associated with a geographic location (also referred to a physical location) of the device. The device may then provide data indicative of the location identifier to another device, such as a network manager device, server, computer, etc. In some embodiments, the device may determine its geographic location after receiving a request for data indicative of its geographic location or an instruction to provide data indicative of its geographic location. In other embodiments, the device may provide data indicative of its geographic location each time it receives, detects or otherwise determines its geographic location or a location identifier associated with the geographic position. Alternatively, the device may provide data indicative of its geographic location only upon request or when it detects, receives or otherwise determines a new location identifier. The network manager or server device may track the location of multiple devices connected to a communications network, each location having a unique location identifier associated with it or having a transponder or other device capable of transmitting or broadcasting such location identifiers for reception or detection by the devices. In some embodiments, the network manager or server device may be in communication with the transponders via a communications network such that the network manager or server device can instruct or request that one or more of the transponders to transmit a location identifier. The network manager or server device also may assign location identifiers to the transponders or otherwise monitor or be aware of the locations of the transponders. These and other features will be discussed in further detail below, by describing a system, individual devices, and processes according to embodiments of the invention.

System

Figure 1:
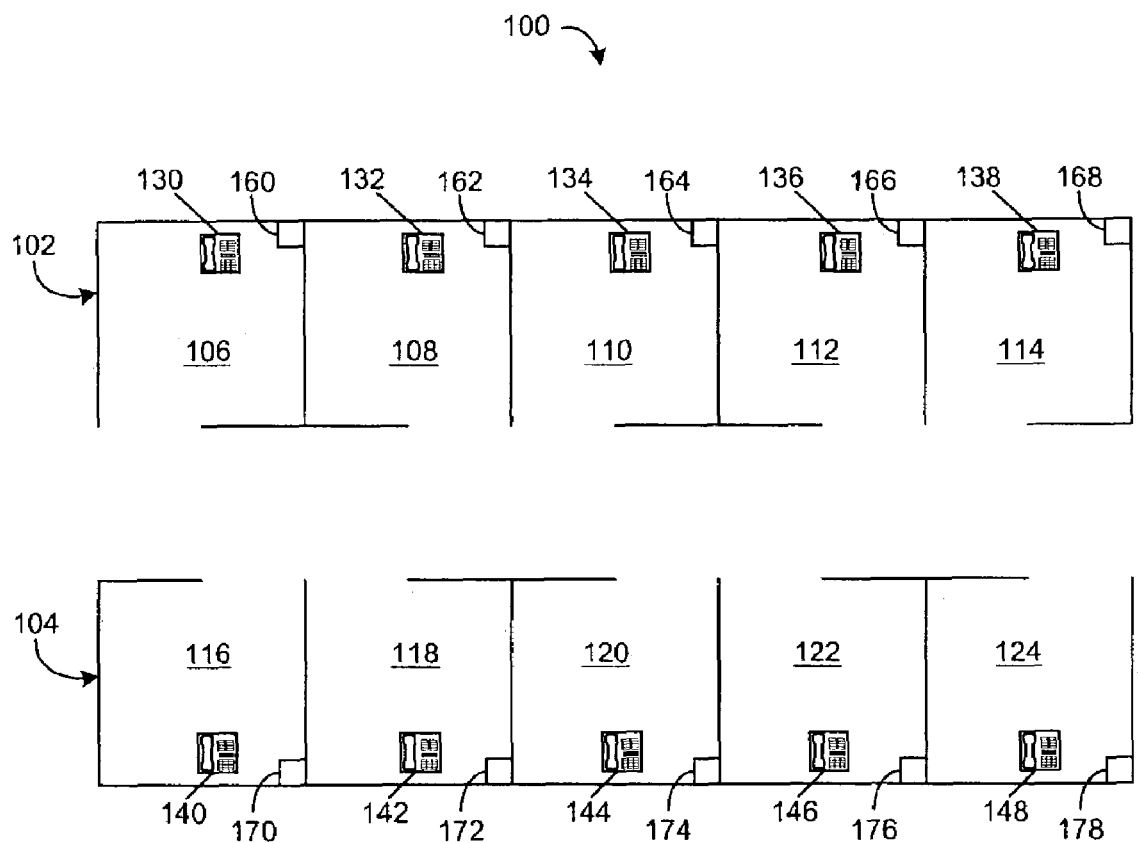
FIG. 1 is an illustration of a typical cubicle office environment that may be used with the present invention.

Now referring to FIG. 1, a conventional office environment 100 is illustrated for use in explanation, but not limitation, of the present invention. In other embodiments, different configurations or environments may be used.

The office layout 100 includes two cubicle sections 102, 104, each of which includes multiple cubicles. The cubicle section 102 includes cubicles 106, 108, 110, 112, 114 while the cubicle section 104 includes cubicles 116, 118, 120, 122, 124. Each cubicle may include a desk, chair, shelf, etc. and/or other office furniture and no specific shape, size, installation, and/or configuration for any cubicle is needed. The office layout 100 may include telephones or other devices 130, 132, 134, 136, 138, 140, 142, 144, 146, 148 for the cubicles 106, 108, 110, 112, 114, 116, 118, 120, 122, 124, respectively. In addition, the office layout 100 may include transponders or other location devices 160, 162, 164, 166, 168, 170, 172, 174, 176, 178 for the cubicles 106, 108, 110, 112, 114, 116, 118, 120, 122, 124, respectively. Transponders may be located in or near cubicles (e.g., on the walls or ceilings near cubicles). In addition, each cubicle may include one or more other types of devices or equipment such as, for example, a computer, a printer, a facsimile machine, etc. One or more of such devices may be IP enabled or compliant and/or be connected to or in communication with a communication network. While the examples provided below are directed primarily to communication devices, such as IP enabled telephones, the methods of the present invention also will work with other types of devices and networks.

The communication devices 130, 132, 134, 136, 138, 140, 142, 144, 146, 148 may be or include IP (Internet Protocol) enabled or compliant telephones connected to a communications network. For example, now referring to FIG. 2, the communication devices 130, 132, 134, 136, 138, 140, 142, 144, 146, 148 may be included in a system 200 and be connected to or able to communicate via a communications network 202. The communication network 202 may include devices (not shown) that allow or enable the communication devices 130, 132, 134, 136, 138, 140, 142, 144, 146, 148 to communicate via other telephone or communications networks or that connect the communications network 202 to other telephone or communications networks.

Each of the communication devices 130, 132, 134, 136, 138, 140, 142, 144, 146, 148 may have an IP address associated with it, programmed into it, assigned to it, etc. The IP addresses may be dynamically configured by the server 204 or another device or maybe permanently associated with the communication devices 130, 132, 134, 136, 138, 140, 142, 144, 146, 148. For example, each time one of the communication devices 130, 132, 134, 136, 138, 140, 142, 144, 146, 148 is connected to the communications network 202, the communications network 202 or a device included in the communications network 202 may assign dynamically a new IP address to the communication device. Alternatively, the IP address for a communication device may stay the same, even if the communication device is disconnected from and then reconnected to (which may be in a different geographic location) the communication network 202.

In some embodiments, each communication device may have one or more telephone or extension numbers or other electronic identifiers associated with it. In some embodiments, a telephone number or extension may "travel" with a communication device such that the communication device may keep the same telephone number or extension even if the communication device is disconnected from and then reconnected to (which may be in a different geographic location) the communication network 202. In other embodiments, the telephone or extension number may change or be reprogrammed or reassigned (e.g., reassigned by a server 204) when the communication device is disconnected from and then reconnected to the communication network 202. As another example, a user may use different telephones in different parts of a building by logging into the telephone by using a telephone or extension number associated with or assigned to the user. Information associated with the user, telephone number and/or extension number may then "move" to the new telephone or location until the user logs out or off of the telephone.

The system 200 also may include a server or other device 204 connected to the communication network 202. In some embodiments, the server 204 may include or be a single device or computer, a networked set or group of devices or computers, PBX, router, a mainframe computer, a workstation, etc. In some embodiments, a server 204 also may function as a database server or have access to one or more databases via the communication network 202. The server 204 also may provide or coordinate network management services for the communications network 202 and/or the system 200 and may function as a network manager device. The server 204 may monitor the geographic location of each of the communication devices 130, 132, 134, 136, 138, 140, 142, 144, 146, 148 or determine their locations when needed, as will be discussed in more detail below. In some embodiments, information regarding one or more communication devices and/or transponders may be stored in a device information database. The server 204 may be able to access the database and/or retrieve information from the database.

The server 204 may be in communication with one or more of the communication devices 130, 132, 134, 136, 138, 140, 142, 144, 146, 148 via the communications network 202 and may send signals to and/or receive signals from one or more of the communication devices 130, 132, 134, 136, 138, 140, 142, 144, 146, 148 via the communications network 202, as will be discussed in more detail below.

Many different types of implementations or hardware/software configurations can be used in the system 200 and with the methods disclosed herein and the methods disclosed herein are not limited to any specific hardware/software configuration for the system 200 or any of its components.

Figure 2:
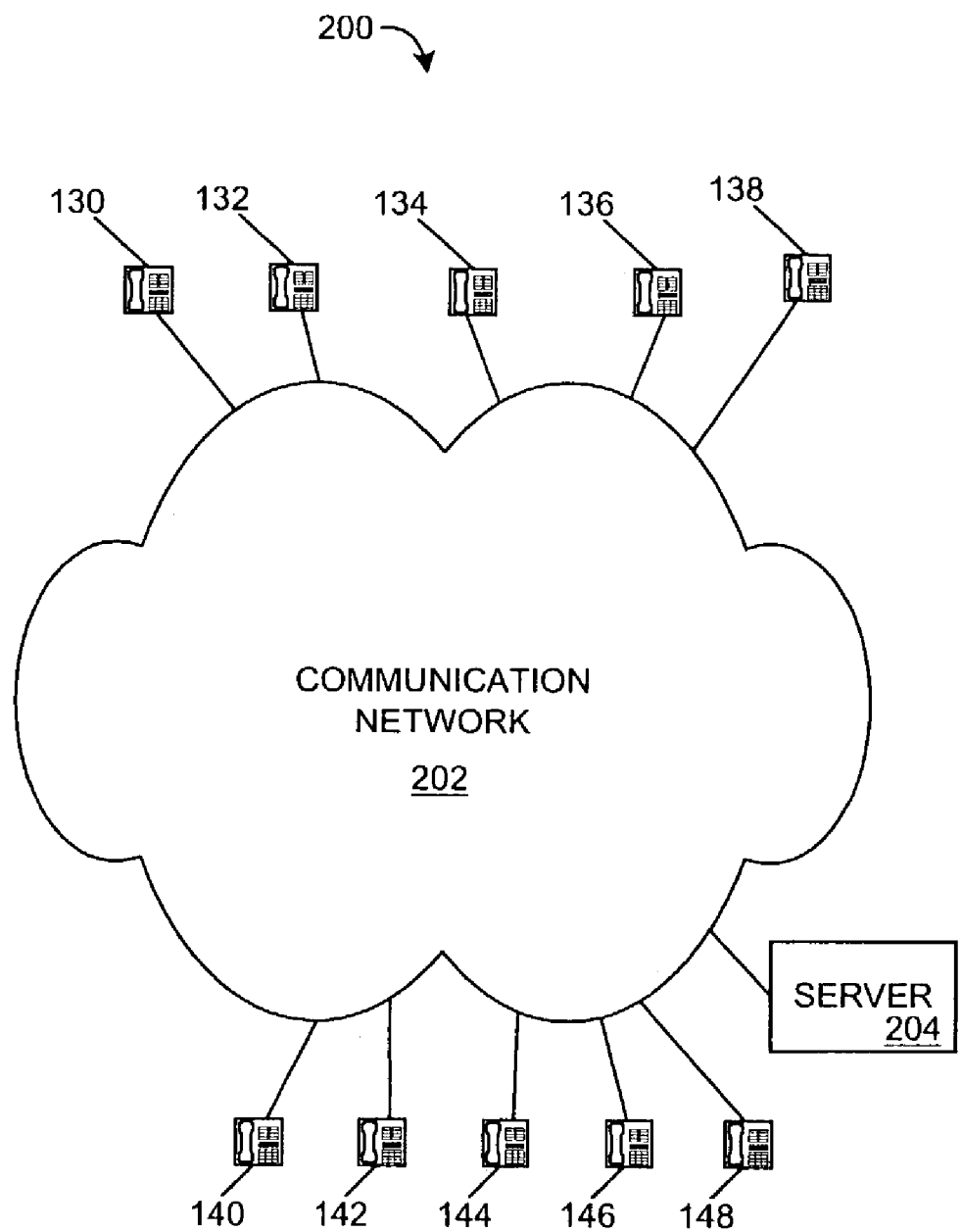
FIG. 2 is a block diagram of system components that may be used with the cubicle office environment of FIG. 1.

The communications network 202 might be or include the Internet, the World Wide Web, or some other public or private computer, cable, telephone, client/server, peer-to-peer, or communications network or intranet, as will be described in further detail below. The communications network 202 illustrated in FIG. 2 is meant only to be generally representative of cable, computer, telephone, peer-to-peer or other communication networks for purposes of elaboration and explanation of the present invention and other devices, networks, etc. may be connected to the communications network 202 without departing from the scope of the present invention. In some embodiments, the communications network 202 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. Moreover, as used herein, communications include those enabled by wired or wireless technology.

Each of the transponders 160, 162, 164, 166, 168, 170, 172, 174, 176, 178 maybe capable of transmitting or broadcasting wirelessly a location identifier associated with it, programmed into it, assigned to it, etc. For example, the transponder 160 may transmit its assigned location identifier every five seconds, upon receiving a request or instruction to do so from a communications device, the server 204, or other device connected to the communication network 202, or based upon some other pattern. In addition, a transponder may transmit other information as well such as, for example, time and date information. Note that no special definition is intended or implied by the use of the term "transponder" and such term is used merely for convenience of explanation of the present invention without intending any specific limitation. A location identifier may be any string of digits, numbers, letters, symbols, etc. The server 204 may have access to a location database that associates different location identifiers with their respective geographic locations. Thus, the location identifier does not itself need to describe the location it is associated with.

Figure 3:
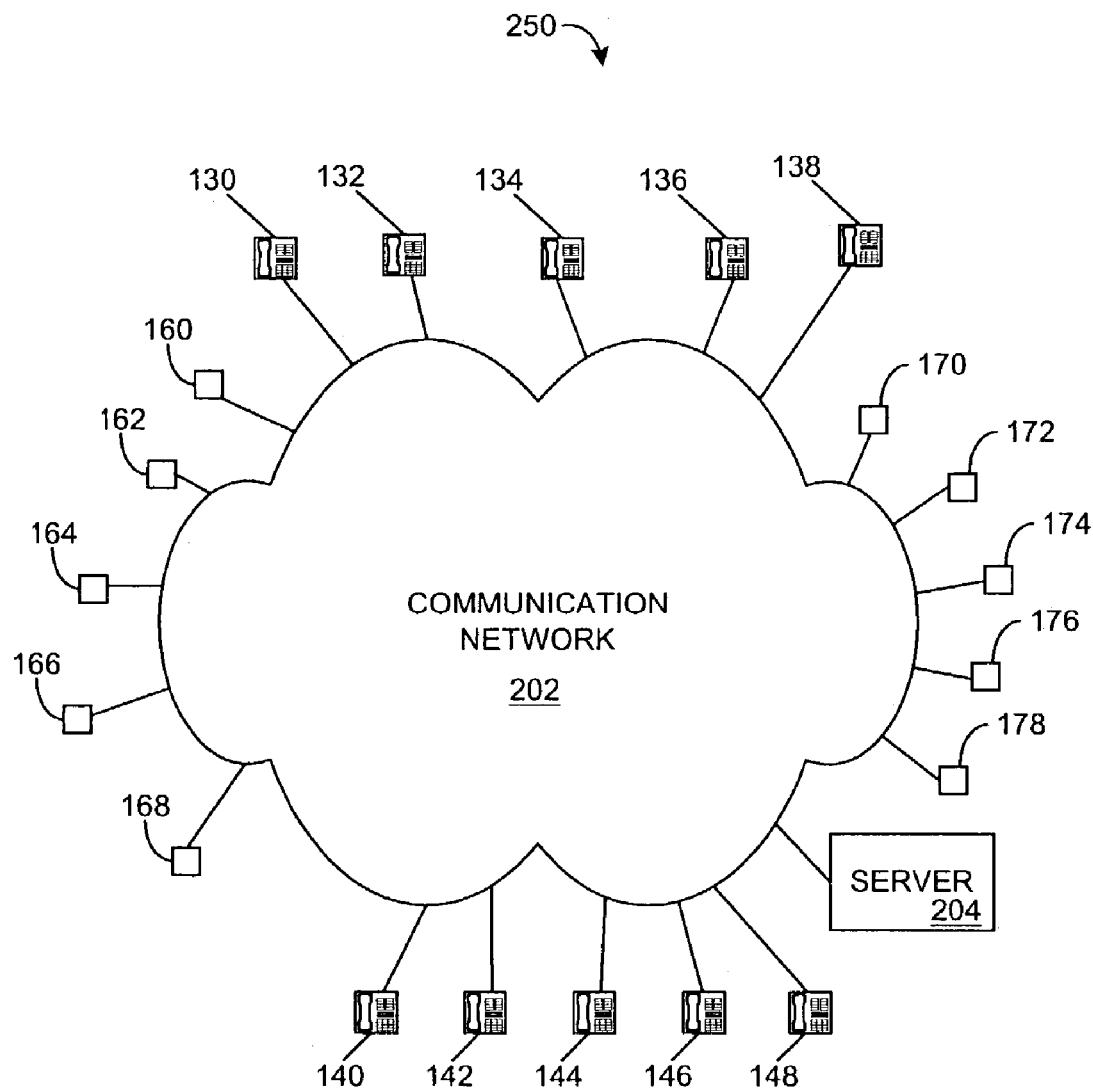
FIG. 3 is another block diagram of system components that may be used with the cubicle office environment of FIG. 1.

Now referring to FIG. 3, another system 250 is illustrated that includes the server 204 and communication network 202 of FIG. 2. In addition, each of the transponder devices 160, 162, 164, 166, 168, 170, 172, 174, 176, 178 also may be connected to or in communication with the communication network 202. The server 204 may be in communication with one or more of the transponder devices 160, 162, 164, 166, 368, 170, 172 174, 176, 178 via the communications network 202 and may send signals to and/or receive signals from one or more of the transponder devices 160, 162, 164, 166, 168, 170, 172. 174, 176, 178 via the communications network 202, as will be discussed in more detail below. For example, the server 204 may assign location identifiers to one or more of the transponders 160, 162, 164, 166, 168, 170, 172, 174, 176, 178 and send the assigned identifiers to the transponders 160, 162, 164, 166, 168, 170, 172, 174, 176, 178 via the communications network 202. As another example. the server 204 may send a signal to one or more of the transponders 160, 162, 164, 166, 168, 170, 172, 174, 176, 178 instructing or requesting the one or more the transponders 160, 162, 164, 166, 168, 170, 172, 174, 176, 178 to broadcast or transmit its respective location identifier, to notify the server 204 when the location identifier is or has been broadcasted or transmitted, or to provide other information.

Figure 4:
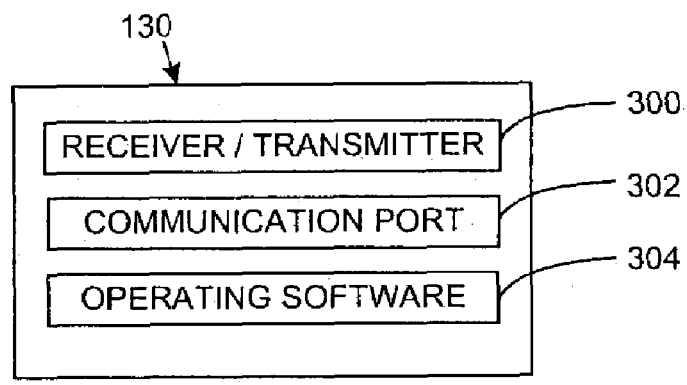
FIG. 4 is a block diagram of potential components for one of the communication devices and one of the transponder devices of FIGS. 1–3.
Figure 4:
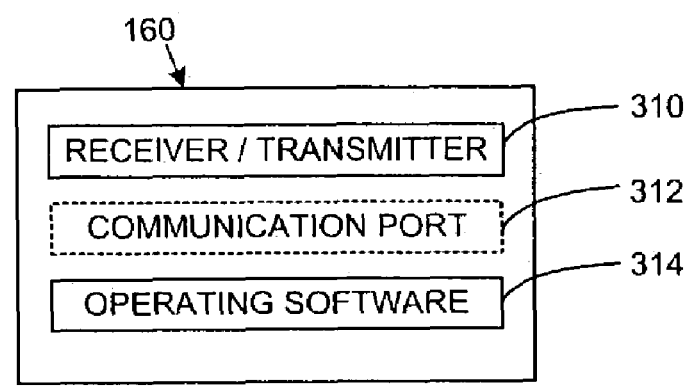

A communications device and/or a transponder device may include various combinations of hardware/software. For example, now referring to FIG. 4, the telephone 130 may include a receiver and/or transmitter 300, a communication port 302 that allows the telephone 130 to communicate with or be attached to the communication network 202, and an operating system 304. In some embodiments, the telephone 130 may be programmed with or assigned a specific IP address for use with the communications network 202, a serial number or other identifier, and/or one or more telephone extension numbers. Similarly, the transponder 160 may include a receiver/transmitter 310, a communication port 312 if the transponder device 160 is connected to the communication network 202, and operating software 314. If the transponder device 160 is connected to the communication network 202, the transponder device 160 may have an IP address or other electronic address assigned to it, associated with it, programmed into it, etc. A communications device and/or a transponder device also might include a control program, memory, input/output devices, antenna, clock, input device, output device, and/or other hardware and/or software components.

As previously discussed above, each of the cubicles 106, 108, 110, 112, 114, 116, 118, 120, 122, 124 may include one or more other types of devices or equipment such as, for example, a computer, a printer, a facsimile machine, etc. One or more of such devices may be IP enabled or compliant and/or be connected to or in communication with the communication network 202. While the examples provided below are directed primarily to communication devices, such as IP enabled telephones, the methods of the present invention also will work with other types of devices.

Process Description

Figure 5:
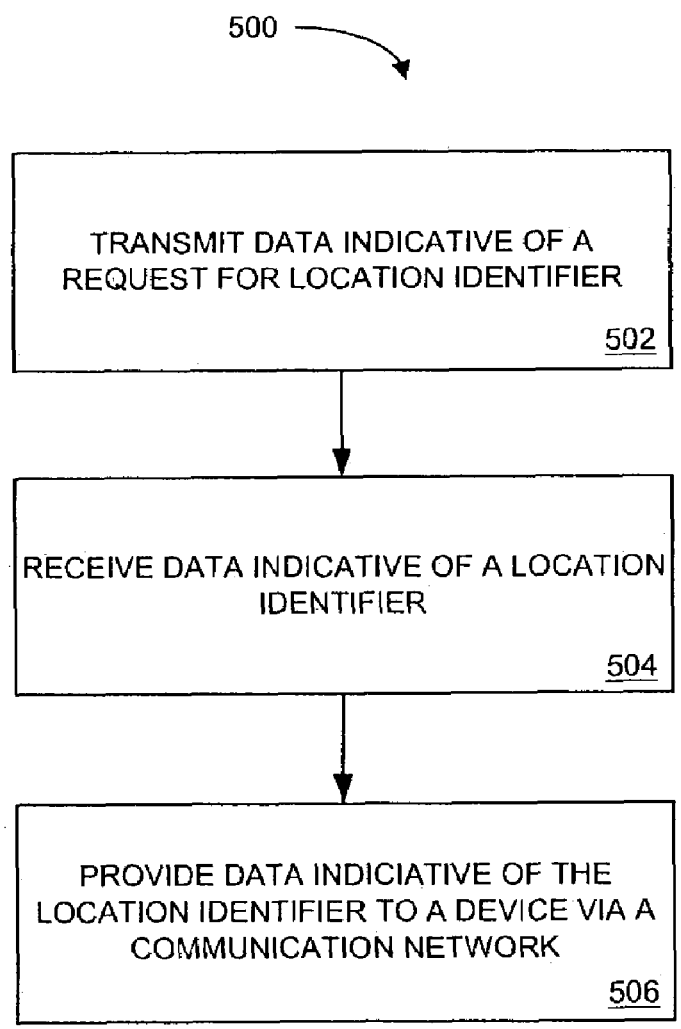
FIG. 5 is a flowchart of a first embodiment of a method in accordance with the present invention.

Reference is now made to FIG. 5, where a flow chart 500 is shown which represents the operation of a first embodiment of the present invention. The particular arrangement of elements in the flow chart 500 is not meant to imply a fixed order to the steps; embodiments of the present invention can be practiced in any order that is practicable. In some embodiments, some or all of the steps of the method 500 may be performed or completed by a communication device, such as the communication device 130, as will be discussed in more detail below. In other embodiments, the method 500 may be implemented by another device (e.g., a computer).

Processing begins at a step 502 during which the communication device 130 transmits data indicative of a request for a location identifier. For example, the communication device 130 may transmit data via the transmitter/receiver 300. The data may include bits or other information indicative of a request by the communication device 130 for a location identifier. The transponder 160 and/or one or more of the other transponders in the office configuration 100 may receive or detect the data transmitted by the communications device 130. In this embodiment, the communication device 130 actively may request location information from the transponder device 160 by providing the signal during the step 502. The transponder device 160 might only provide a response that includes a location identifier upon receiving or detecting the signal produced by the communication device during the step 502.

In some embodiments, the communication device 130 may transmit data indicative of a request for a location identifier at regular intervals, periodically, only when requested by the server 204 or another device, or at times based upon other criteria. For example, the communication device 130 may send data indicative of a request for a location identifier after being disconnected from the communication network 202 and then reconnected to the communication network 202, after power resumes subsequent to a power loss, every five minutes, etc.

During a step 504, the communications device 130 may receive data indicative of a location identifier. For example, the communications device 130 may receive data transmitted by the transponder device 160, the data including a code or other identifier indicating the cubicle 106, the cubicle system 102, or some other geographic location related to or associated with the communication device 130, the date/time of the transmission by the transponder 160, etc. In addition, or alternatively, the data received during the step 504 may include an IP address, a date/time code or stamp, a serial number, code or other identifier associated with the transponder device 160, which can be used to determine the geographic location of the communications device 130, etc. The transponder device 160 may transmit the data wirelessly, such as via a radio, optical link, Bluetooth, or other wireless delivery channel.

In some embodiments, the communications device 130 may receive different location identifiers from different transponders or other sources during or as part of the step 504. For example, the transponder 160 and the transponder 162 may receive or detect the data transmitted by the communication device 130 during the step 502 and each may respond with signals indicative of location identifiers. That is, the transponder 160 may receive or detect the data transmitted by the communication device 130 during the step 502 and transmit a first location identifier in response and the transponder 162 may receive or detect the data transmitted by the communication device 130 during the step 502 and transmits a second location identifier in response. The first location identifier may be associated with the first transponder 160 and the second location identifier may be associated with the second transponder 162.

During a step 506, the communications device 130 may send or otherwise provide data indicative of the location identifier received during the step 504 to the server 204 and/or another device via the communications network 202. For example, the communications device 130 may send an email message, instant message, or other electronic signal or communication to the server 204 via the communications network 202 that includes some or all of the data the communications device 130 received during the step 504. In addition, the communications device 130 may send information regarding the IP address assigned to or programmed into the communications device 130, a telephone number or extension programmed into or being used by the communications device 130, a serial number or other identifier associated with the communications device 130, etc.

In embodiments where the communications device 130 receives or detects location identifiers from more than one transponder during the step 504, the communication device 130 may include both location identifiers in the data sent during the step 506. Alternatively, the communication device 130 may send only the location identifier received or detected first by the communication device 130, the location identifier that is determined by the communication device 130 to be have the strongest signal or highest signal strength, etc.

In some embodiments, the method 500 may include the communication device 130 receiving a message from the server 204 to update its location information. For example, the communication device 130 may receive an electronic communication from the server 204 via the communications network, the electronic communication including data indicative of a request for the communication device 130 to provide a location identifier and/or other information to the server 204.

Figure 6:
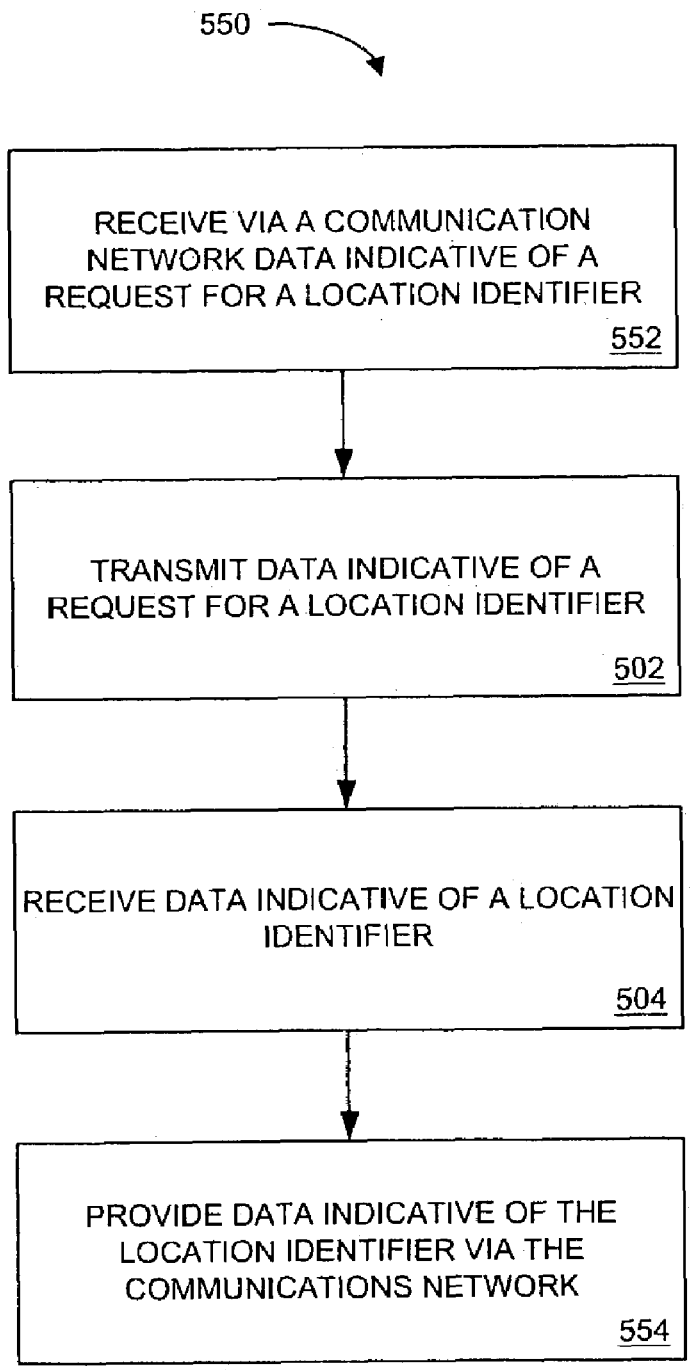
FIG. 6 is a flowchart of a second embodiment of a method in accordance with the present invention.

Reference is now made to FIG. 6, where a flow chart 550 is shown which represents the operation of a second embodiment of the present invention. The particular arrangement of elements in the flow chart 550 is not meant to imply a fixed order to the steps; embodiments of the present invention can be practiced in any order that is practicable. In some embodiments, some or all of the steps of the method 550 may be performed or completed by a communication device, such as the communication device 130. In other embodiments, the method 550 may be implemented by another device (e.g., a computer).

Processing begins at a step 552 during which the communication device 130 receives an electronic communication from the server 204 or another device via the communication network 202, the electronic communication including data indicative of a request for the communication device 130 to provide a location identifier to the server 204 or other device. For example, the server 204 may send an email message, instant message, or other electronic signal or communication to the communication device 130 requesting such information.

After the step 552, the method 550 includes the steps 502 and 504 previously discussed above.

During a step 554, the communication device 130 provides an electronic communication via the communications network 202 to the server 204, the electronic communication being indicative of the location identifier received or detected by the communication device 130 during the step 504. The step 554 is similar to the step 506 previously discussed above.

Figure 7:
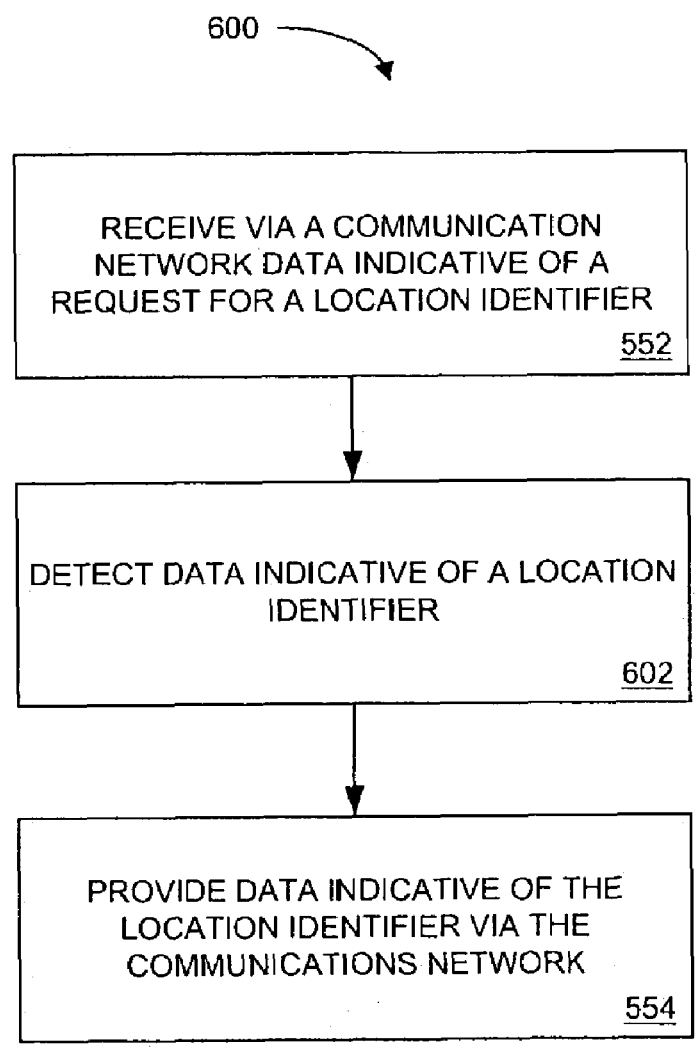
FIG. 7 is a flowchart of a third embodiment of a method in accordance with the present invention.

Reference is now made to FIG. 7, where a flow chart 600 is shown which represents the operation of a third embodiment of the present invention. The particular arrangement of elements in the flow chart 600 is not meant to imply a fixed order to the steps; embodiments of the present invention can be practiced in any order that is practicable. In some embodiments, some or all of the steps of the method 600 may be performed or completed by a communication device, such as the communication device 130. In other embodiments, the method 600 may be implemented by another device (e.g., a computer).

The method 600 includes the step 552 previously discussed above. During a step 602, the communications device 130 may detect a signal produced by the transponder device 160 and/or another device. In this example, the communication device 130 is not actively sending out a request for a location identifier as was the case in the methods 500 and 550. Instead, the communications device 130 is passively listening or detecting a signal produced by a transponder device. A transponder device may periodically or randomly send out or transmit location identifier signals. Alternatively, if the transponder is connected to the communications network 202, the server 204 or another device may send signals to one or more of the transponders 160, 162, 164, 166, 168, 170, 172, 174, 176, 178 instructing or requesting that the transponders 160, 162, 164, 166, 168, 170, 172, 174, 176, 178 transmit their location identifiers. Two or more of the transponders 160, 162, 164, 166, 168, 170, 172, 174, 176, 178 may transmit their location identifiers simultaneously or at different times. After the step 602, the method 600 includes the step 554 previously discussed above.

Figure 8:
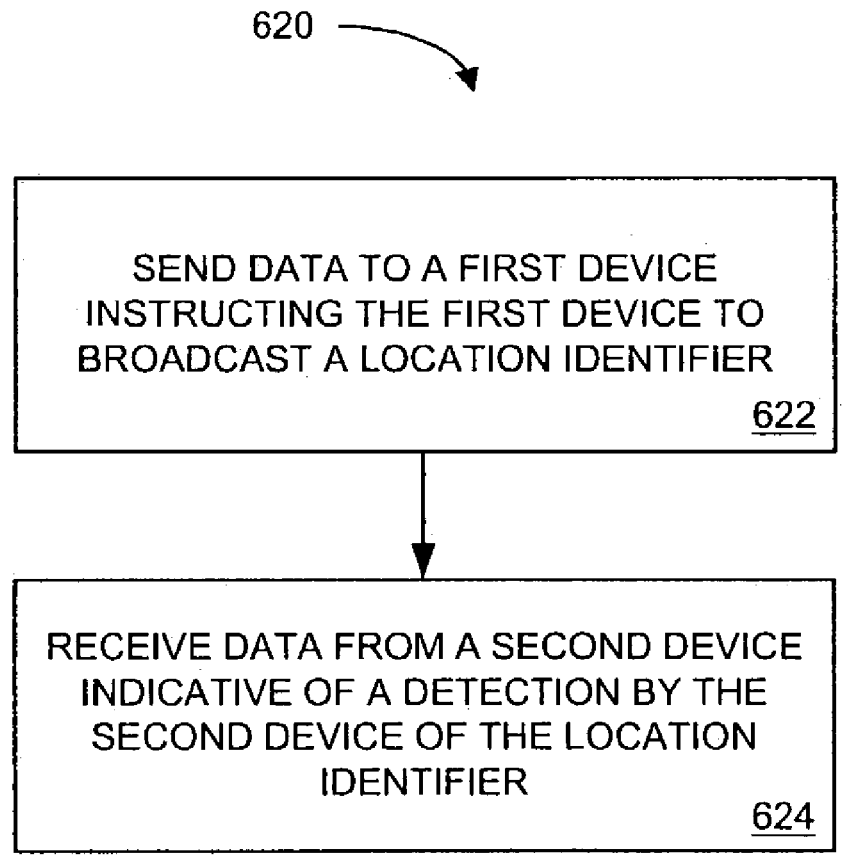
FIG. 8 is a flowchart of a fourth embodiment of a method in accordance with the present invention.

Reference is now made to FIG. 8, where a flow chart 620 is shown which represents the operation of a fourth embodiment of the present invention. The particular arrangement of elements in the flow chart 620 is not meant to imply a fixed order to the steps; embodiments of the present invention can be practiced in any order that is practicable. In some embodiments, some or all of the steps of the method 620 may be performed or completed by the server 204 or another device.

During a step 622, the server 204 sends a signal or other data to a first device, e.g., the transponder 160, instructing or requesting the device to broadcast or transmit a location identifier associated with the first device. Both the server 204 and the first device may communicate or be in contact with each other via the communications network 202 or some other communications network. In some embodiments, the server 204 previously may have assigned a location identifier to the first device and/or or provided a signal or other data to the first device indicative of the location identifier associated with the first device. In some embodiments, the signal or other data sent by the server 204 may include the location identifier the first device is to transmit or send. In some embodiments, the server 204 may instruct or request that the first device broadcast the location identifier at a one or more designated times, randomly, periodically, at fixed intervals, a minimum and/or maximum number of times, a designated number of times, etc. The communication or data transmitted by the transponder 160 may include the IP address or other electronic address associated with the transponder, the time/date of the transmission by the transponder 160, and/or other information.

During a step 624, the server 204 receives a signal or other data from a second device (e.g., the communications device 130) indicative of a location identifier associated with the first device. For example, the communications device 130 may receive a location identifier transmitted by the transponder device 160. During the step 624, the server 204 may receive a communication or other data from the communication device 130 indicative of the location identifier received by the communication device 130 from the transponder 160. In addition, the communication from the communication device 130 may include a code or other identifier indicating the cubicle 106, the cubicle system 102, or some other geographic location related to or associated with the communication device 130, the date/time of the transmission by the transponder 160 received by the communication device, the date/time of the communication sent by the communication device 130 to the server 204, an IP or other electronic address associated with the communication device 130, a serial number, code or other identifier associated with the communication device 130, an extension number associated with the communication device 130, an IP or other electronic address associated with the transponder device 160, etc.

Figure 9:
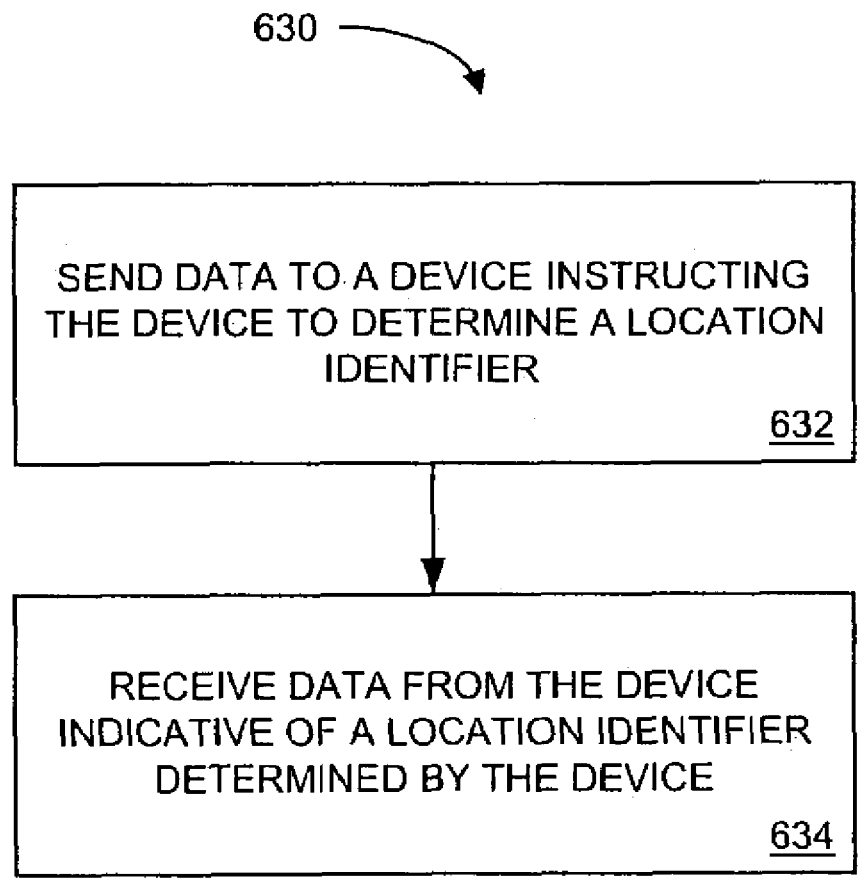
FIG. 9 is a flowchart of a fifth embodiment of a method in accordance with the present invention.

Reference is now made to FIG. 9, where a flow chart 630 is shown which represents the operation of a fifth embodiment of the present invention. The particular arrangement of elements in the flow chart 630 is not meant to imply a fixed order to the steps; embodiments of the present invention can be practiced in any order that is practicable. In some embodiments, some or all of the steps of the method 630 may be performed or completed by the server 204 or another device.

During a step 632, the server 204 sends a communication or other data to a device, e.g., the communications device 130, instructing or requesting that the device determine a location identifier and/or provide a location identifier to the server 204. For example, the server 204 may send a message to the communication device 130 via the communication network 202 requesting that the communication device 130 provide a location identifier to the server 204. The communication device 130 may then determine a location identifier as previously described above. In some embodiments, the communication device 130 may use a previously received or detected location identifier or actively or passively determine a new one. In some embodiments, the data sent by the server 204 during the step 632 may include instructions as to whether the communication device 130 can use a previously determined location identifier (and if so, how old it can be) or must determine a new location identifier in response to the request.

During a step 634, the server 204 receives data from the device indicative of a location identifier determined by the device. In addition, the data received by the server 204 during the step 634 may include other information. For example, data received by the server 204 from the communication device 130 may include a code or other identifier indicating the cubicle 106, the cubicle system 102, or some other geographic location related to or associated with the communication device 130, the date/time of the transmission by the transponder 160 received or detected by the communication device, the date/time of the communication sent by the communication device 130 to the server 204, an IP or other electronic address associated with the communication device 130, a serial number, code or other identifier associated with the communication device 130, an extension number associated with the communication device 130, an IP or other electronic address associated with the transponder device 160, etc.

Server

Figure 10:
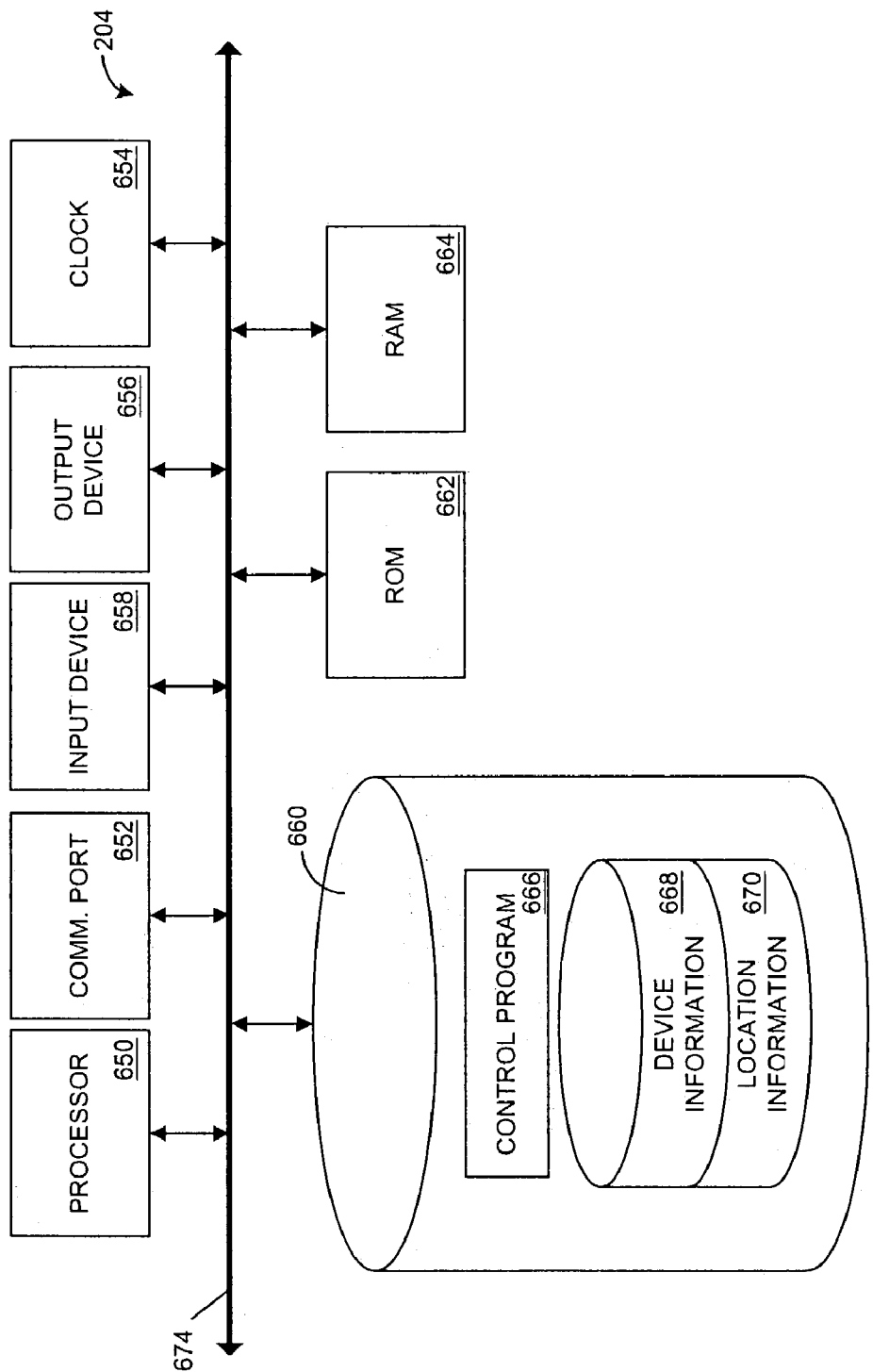
FIG. 10 is a block diagram of components for an embodiment of a the server of FIGS. 2–3.

Now referring to FIG. 10, a representative block diagram of a server or controller 204 is illustrated. The server 204 may include a processor, microchip, central processing unit, or computer 650 that is in communication with or otherwise uses or includes one or more communication ports 652 for communicating with communication devices, transponder devices and/or other devices, the communication network 202, other communication networks, etc. Communication ports may include such things as local area network adapters, wireless communication devices, Bluetooth technology, etc. The server 204 also may include an internal clock element 654 to maintain an accurate time and date for the server 204, create time stamps for communications received or sent by the server 204, etc.

If desired, the server 204 may include one or more output devices 656 such as a printer, infrared or other transmitter, antenna, audio speaker, display screen or monitor, text to speech converter, etc., as well as one or more input devices 658 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 204 may include a memory or data storage device 660 to store information, software, databases, communications, device drivers, IP addresses, telephone extensions, etc. The memory or data storage device 660 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The server 204 also may include separate ROM 662 and RAM 664.

The processor 650 and the data storage device 660 in the server 204 each may be, for example: (i) located entirely within a single computer or other computing device; or (ii) connected to each other by a remote communication medium, such as a serial port cable, telephone line or radio frequency transceiver. In one embodiment, the server 204 may comprise one or more computers that are connected to a remote server computer for maintaining databases.

A conventional personal computer or workstation with sufficient memory and processing capability may be used as the server 204. In one embodiment, the server 204 operates as or includes a Web server for an Internet environment. The server 204 preferably is capable of high volume transaction processing, performing a significant number of mathematical calculations in processing communications and database searches. A Pentium™ microprocessor, such as the Pentium III™ or IV™ microprocessor manufactured by Intel Corporation, may be used for the processor 650. Equivalent processors are available from Motorola, Inc., AMD, or Sun Microsystems, Inc. The processor 650 also may comprise one or more microprocessors, computers, computer systems, etc.

Software may be resident and operating or operational on the server 204. The software may be stored on the data storage device 660 and may include a control program 666 for operating the server, databases, etc. The control program 666 may control the processor 650. The processor 650 preferably performs instructions of the control program 666, and thereby operates in accordance with the present invention, and particularly in accordance with the methods described in detail herein. The control program 666 may be stored in a compressed, uncompiled and/or encrypted format. The control program 666 furthermore includes program elements that may be necessary, such as an operating system, a database management system and device drivers for allowing the processor 650 to interface with peripheral devices, databases, etc. Appropriate program elements are known to those skilled in the art, and need not be described in detail herein.

The server 204 also may include or store information regarding transponders, communication devices, IP addresses, extensions, locations, networks, office or equipment configurations or layouts, communications, etc. For example, information regarding one or more devices may be stored in a device information database 668 for use by the server 204 or another device or entity. Information regarding one or more locations may be stored in a location information database 670 for use by the server 204 or another device or entity. In some embodiments, some or all of one or more of the databases may be stored or mirrored remotely from the server 204.

According to an embodiment of the present invention, the instructions of the control program may be read into a main memory from another computer-readable medium, such as from the ROM 662 to the RAM 664. Execution of sequences of the instructions in the control program causes the processor 650 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 650, communication port 652, clock 654, output device 656, input device 658, data storage device 660, ROM 662, and RAM 664 may communicate or be connected directly or indirectly in a variety of ways. For example, the processor 650, communication port 652, clock 654, output device 656, input device 658, data storage device 660, ROM 662, and RAM 664 may be connected via a bus 674.

While specific implementations and hardware configurations for the server 204 has been illustrated, it should be noted that other implementations and hardware/software configurations are possible and that no specific implementation or hardware/software configuration is needed. Thus, not all of the components illustrated in FIG. 10 may be needed for a server implementing the methods disclosed herein.

Devices

As mentioned above, a device 130, 132, 134, 136, 138, 140, 142, 144, 146, 148 may be or include any of a number of different types of devices, including, but not limited to a personal computer, portable computer, user station, workstation, network terminal or server, telephone, kiosk, dumb terminal, personal digital assistant, facsimile machine, radio, cable set-top box, printer, etc. In some embodiments, one or more of the devices 130, 132, 134, 136, 138, 140, 142, 144, 146, 148 may have the same structure or configuration as the server 204 illustrated in FIG. 10 and include some or all of the hardware and/or software components of the server 204 illustrated in FIG. 10. Such components may be in addition to, or in lieu of, the hardware/software components illustrated in FIG. 4.

Databases

As previously discussed above, in some embodiments a server, user device, or other device may include or access a device information database for storing or keeping information regarding one or more device. One representative device information database 700 is illustrated in FIG. 11. For purposes of explanation, but not limitation, the database 700 is assumed to include information only regarding IP telephones.

The device information database 700 may include a device identifier field 702 that may include codes or other identifiers for one or more devices, a device type field 704 that may include information (e.g., model numbers, serial numbers) or descriptions for the devices identified in the field 702, a location identifier field 706 that may include codes or other identifiers associated with the locations of the devices identified in the field 702, a device IP address field 708 that may include IP or other electronic addresses for the devices identified in the field 702, and a device extension field 710 that may include telephone numbers or other extension information for the devices identified in the field 702.

Other or different fields also may be used in the device information database 700. For example, in some embodiments a device information database 700 may include information regarding the date/time the IP addresses were assigned to the devices identified in the field 702, information regarding whether or not the IP addresses were assigned to the devices dynamically, information regarding the last time a device identified in the field 702 detected or received data regarding its geographic location and/or provided such data to The server 204 or another device, etc. As illustrated by the device information database 700 of FIG. 11, the device identified as "D-19837" in the field 702 is an "IP PHONE" having an IP address "12.34.98.210" and an extension "25671". In addition, the device "D-19837" is at or near a geographic location identified as "L-2314". The location for the device identified as "D-68077" currently is unknown.

As previously discussed above, in some embodiments a server, user device, or other device may include or access a location information database for storing or keeping information regarding one or more locations of devices, equipment, etc. One representative location information database 750 is illustrated in FIG. 12.

The location information database 750 may include a location field 752 that may include codes or other identifiers for one or more locations, a location description field 754 that may include descriptive information regarding the locations identified in the field 752, and a transponder identifier field 756 that may include codes or other for transponders associated with the locations identified in the field 752 and/or located in the locations described in the field 754. As illustrated by the location information database 750 of FIG. 12, the location identified as "L-2314" in the field 752 is the "SECOND FLOOR, AISLE C, CUBICLE 14" and is associated with the transponder identified as "T-175". Other or different fields also maybe used in the location information database 750.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can-be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

What is claimed:

1. A method for determining a location of a device that is part of a communication network, comprising:

wirelessly transmitting from a transponder a request including data indicative of a location identifier associated with a geographic area of said transponder;

receiving, by said device, said request including said data indicative of said location identifier transmitted by said transponder, wherein said device is connected to said communication network and comprises an IP compliant client device;

sending, in response to said request, said data indicative of said location identifier from said device to a server connected to said communication network via said communication network, wherein said server associates said location identifier with said device; and sending instructions to said device from said server as to whether said device is allowed to use a previously determined location identifier and as to how old the previously determined identifier is allowed to be.

2. The method of claim 1, wherein said server is adapted to send data to said device indicative of a request for said device to provide said location identifier to said server.

3. The method of claim 1, wherein said device is adapted to send data to said transponder indicative of a request for said transponder to transmit said location identifier.

4. The method of claim 1, wherein said communication network comprises an IP compliant network and said device comprises an IP enabled telephony client device.

* * * * *